(12) United States Patent
Rivera et al.

(10) Patent No.: US 9,796,533 B2
(45) Date of Patent: Oct. 24, 2017

(54) KILN CART PUSHER

(71) Applicant: USNR, LLC, Woodland, WA (US)

(72) Inventors: Alejandro Rivera, Jacksonville, FL (US); Wade Beery, Orange Park, FL (US); Roger M. Verboncoeur, Jr., Jacksonville, FL (US); Phong Tan Ngo, Jacksonville, FL (US); Jeff Morton, Fleming Island, FL (US)

(73) Assignee: USNR, LLC, Woodland, WA (US)

( * ) Notice: Subject to any disclaimer, the term of this patent is extended or adjusted under 35 U.S.C. 154(b) by 0 days.

(21) Appl. No.: 15/364,237

(22) Filed: Nov. 29, 2016

(65) Prior Publication Data

US 2017/0247195 A1 Aug. 31, 2017

Related U.S. Application Data

(63) Continuation of application No. 15/182,323, filed on Jun. 14, 2016, now Pat. No. 9,534,842.

(60) Provisional application No. 62/300,770, filed on Feb. 27, 2016.

(51) Int. Cl.
*B65G 25/10* (2006.01)
*F26B 25/00* (2006.01)

(52) U.S. Cl.
CPC ............ *B65G 25/10* (2013.01); *F26B 25/003* (2013.01)

(58) Field of Classification Search
CPC .............................. F26B 25/003; B65G 25/10
USPC .......................... 198/717, 736, 738, 747, 749
See application file for complete search history.

(56) References Cited

U.S. PATENT DOCUMENTS

| | | | | |
|---|---|---|---|---|
| 1,567,473 A | * | 12/1925 | Starr ....................... | B65G 67/00 198/746 |
| 1,782,955 A | * | 11/1930 | Biggert, Jr. .......... | C21D 9/0018 414/198 |
| 3,767,064 A | * | 10/1973 | Lutz ....................... | B65G 25/02 180/8.1 |
| 3,874,302 A | * | 4/1975 | Crosswhite ............. | B61B 10/04 104/170 |

(Continued)

FOREIGN PATENT DOCUMENTS

| | | |
|---|---|---|
| CN | 2365626 U | 2/2000 |
| DE | 4217125 C1 | 12/1993 |

OTHER PUBLICATIONS

Canadian Patent Application No. 2,933,213; Examiner's Report; dated Nov. 28, 2017.

*Primary Examiner* — Douglas Hess
(74) *Attorney, Agent, or Firm* — Schwabe Williamson & Wyatt, P.C.

(57) ABSTRACT

Embodiments of a pusher device may include a frame, guide rails coupled to the frame, a carriage slideable along the guide rails, and a linear positioner coupled to the carriage and frame and operable to move the carriage along the guide rails. Two or more lugs may be mounted to the carriage and rotatable between a resting position, in which the forward ends of the lugs can contact the transverse supports of a tram above the carriage, and a lowered position in which the lugs can pass below the transverse supports. In the resting position, the longitudinal axis of each lug may be inclined from rear to front, such that the lugs contact the tram with the front end (as opposed to a longitudinal side) of the lugs. The lugs be generally triangular, trapezoidal, or concave polygonal in profile. Corresponding methods and systems are also disclosed herein.

30 Claims, 18 Drawing Sheets

(56) References Cited

U.S. PATENT DOCUMENTS

| | | | | | |
|---|---|---|---|---|---|
| 3,882,792 | A | * | 5/1975 | McIntier | B65G 25/10 104/162 |
| 3,902,430 | A | * | 9/1975 | Ott | B61B 10/04 104/172.2 |
| 3,986,605 | A | * | 10/1976 | Dooley | B65G 47/265 198/746 |
| 4,018,328 | A | * | 4/1977 | Galarowic | B65G 25/10 198/741 |
| 4,075,949 | A | * | 2/1978 | Davis | A01G 9/143 104/162 |
| 4,170,292 | A | * | 10/1979 | Lang | B65G 25/10 104/162 |
| 4,492,503 | A | * | 1/1985 | Thomas | B65G 49/08 198/468.8 |
| 4,600,099 | A | * | 7/1986 | Peddinghaus | B23Q 7/001 198/468.6 |
| 4,790,426 | A | * | 12/1988 | Tsuzuki | B23Q 7/003 198/741 |
| 5,042,392 | A | * | 8/1991 | Brethorst | B61J 3/08 104/162 |
| 5,899,317 | A | * | 5/1999 | Chisaki | C10B 31/06 110/289 |
| 6,179,109 | B1 | * | 1/2001 | Haldimann | B65G 1/06 193/2 R |
| 6,368,046 | B1 | * | 4/2002 | Burnett | B60P 1/006 100/273 |
| 7,850,020 | B2 | * | 12/2010 | Konsant | B62B 3/00 104/242 |
| 8,016,281 | B1 | * | 9/2011 | Sting | B43M 3/045 198/737 |
| 8,950,573 | B2 | * | 2/2015 | Poteat | B65B 51/04 198/747 |
| 9,534,842 | B1 | * | 1/2017 | Rivera | F26B 25/003 |

\* cited by examiner

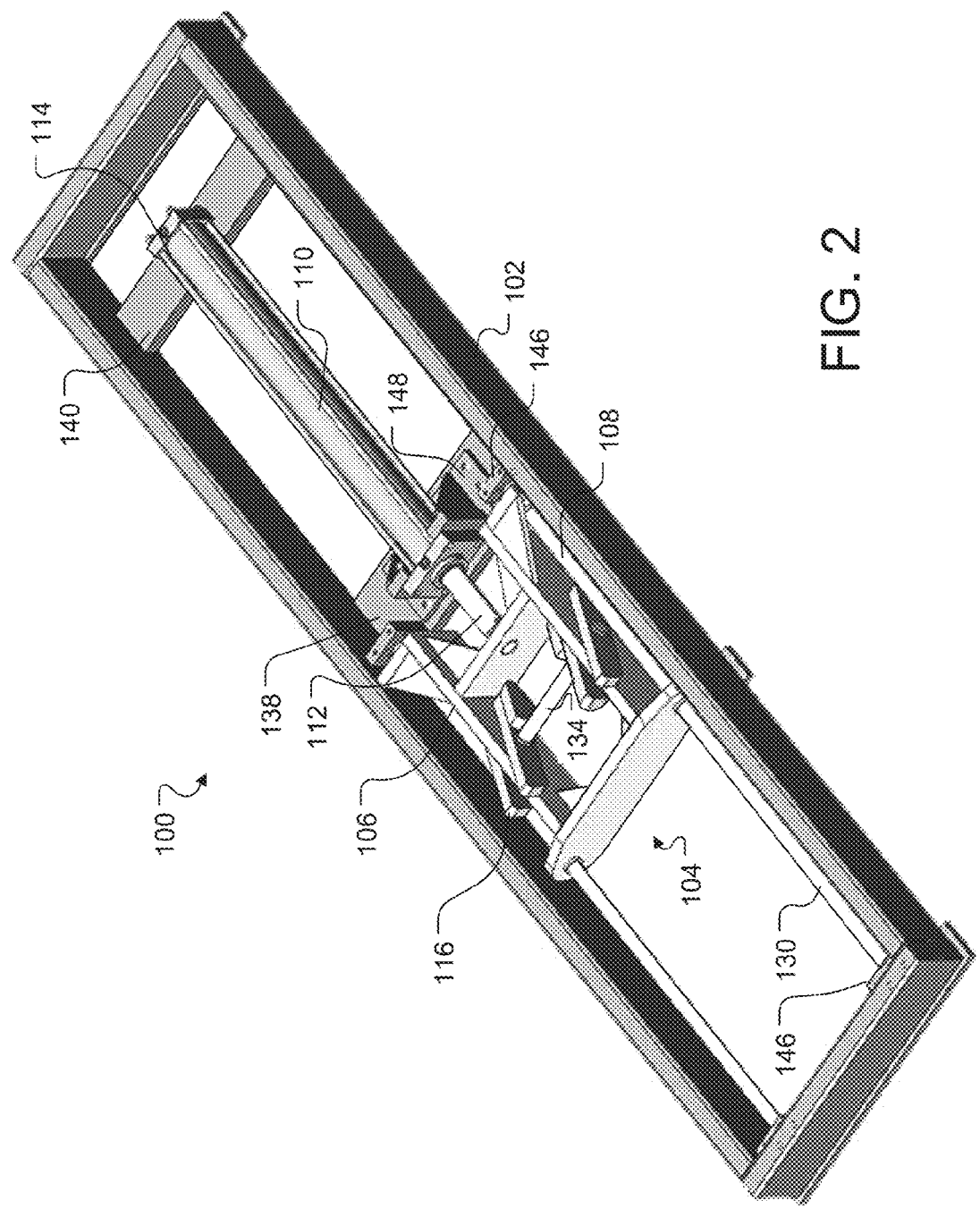

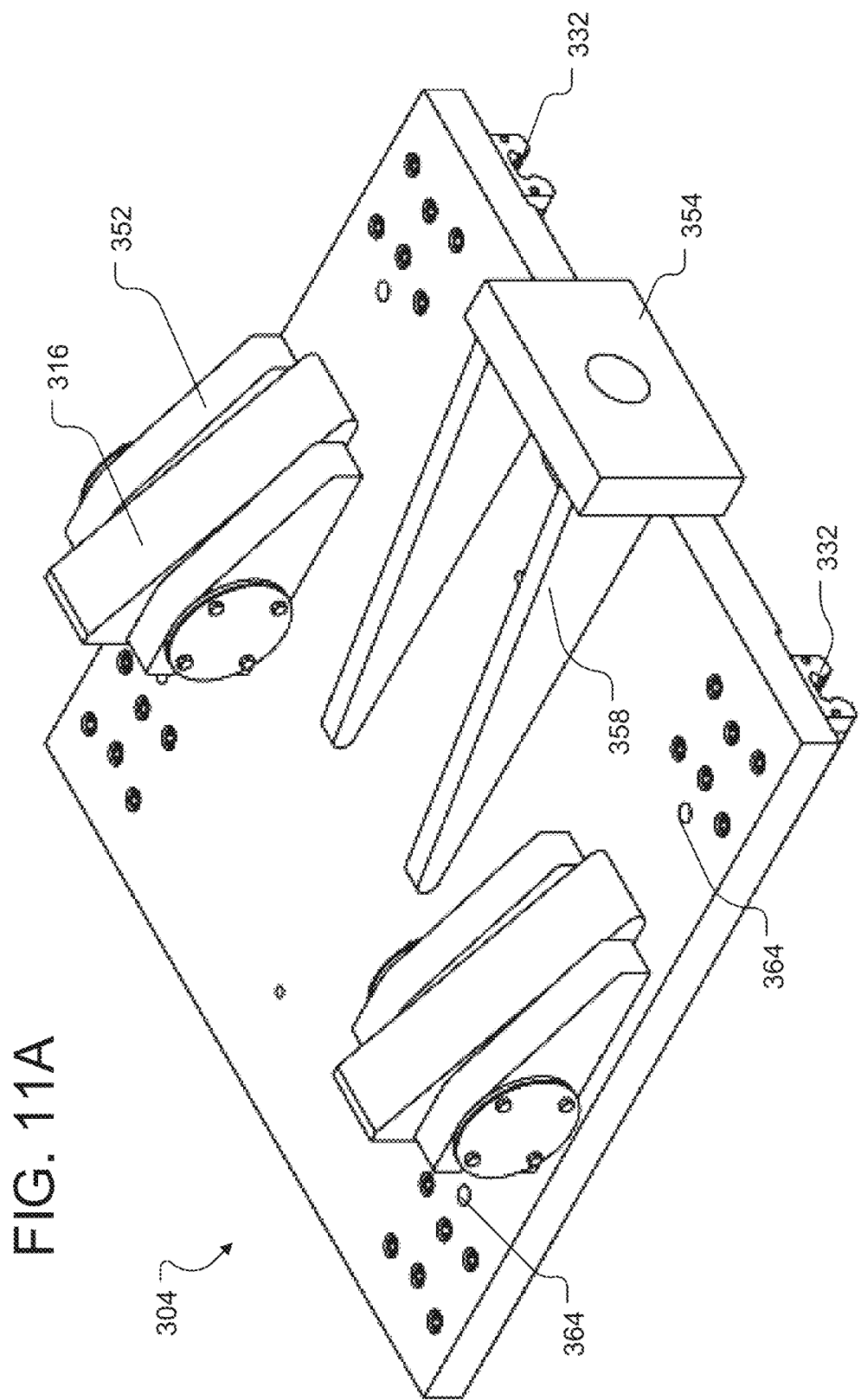

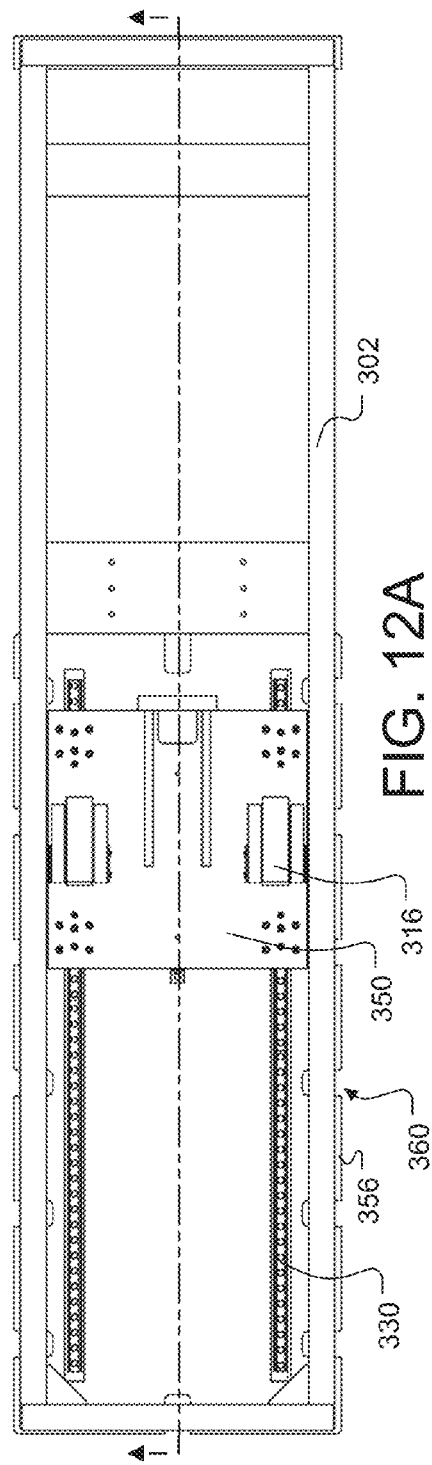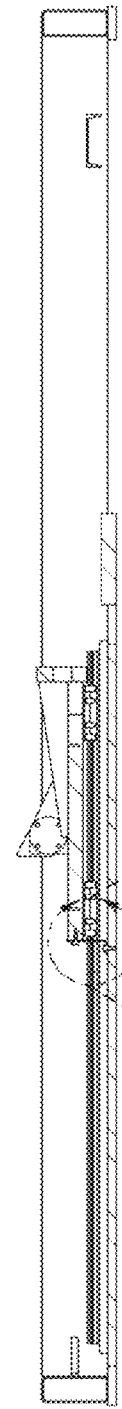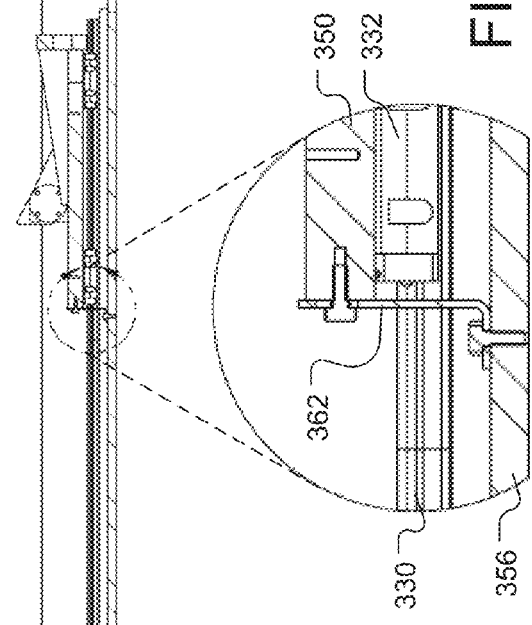

KILN CART PUSHER

CROSS REFERENCE TO RELATED APPLICATION

The present application is a continuation of and claims priority to U.S. patent application Ser. No. 15/182,323, filed Jun. 14, 2016, which claims priority to U.S. patent application Ser. No. 62/300,770, filed Feb. 27, 2016, both titled "KILN CART PUSHER," the entire disclosures of which are incorporated by reference herein.

BACKGROUND

Conventional track-type lumber kilns are provided with a set of rails that extend through the kiln. Lumber packages are loaded onto wheeled carts, or trams, which typically include a series of transverse supports mounted to a wheeled frame. The trams are moved through the kiln along the track in an end-to-end arrangement. As each tram is moved into the kiln, it is forced against the lagging end of the next to advance the entire line of trams.

A pusher device is typically used to push the trams through the kiln. One type of conventional pusher device uses a hydraulic cylinder to exert force against the trams. However, conventional pusher devices may be prone to breakage or failure under harsh conditions.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 2 is a perspective view of an embodiment of a pusher device;

FIG. 11A is a perspective view of components of a pusher device as shown in FIG. 10;

FIGS. 12A-12B are plan and side elevational views, respectively, of a pusher device as shown in FIG. 10;

FIG. 12C is a magnified view of a portion of FIG. 12B;

DETAILED DESCRIPTION OF DISCLOSED EMBODIMENTS

Figure 1A:
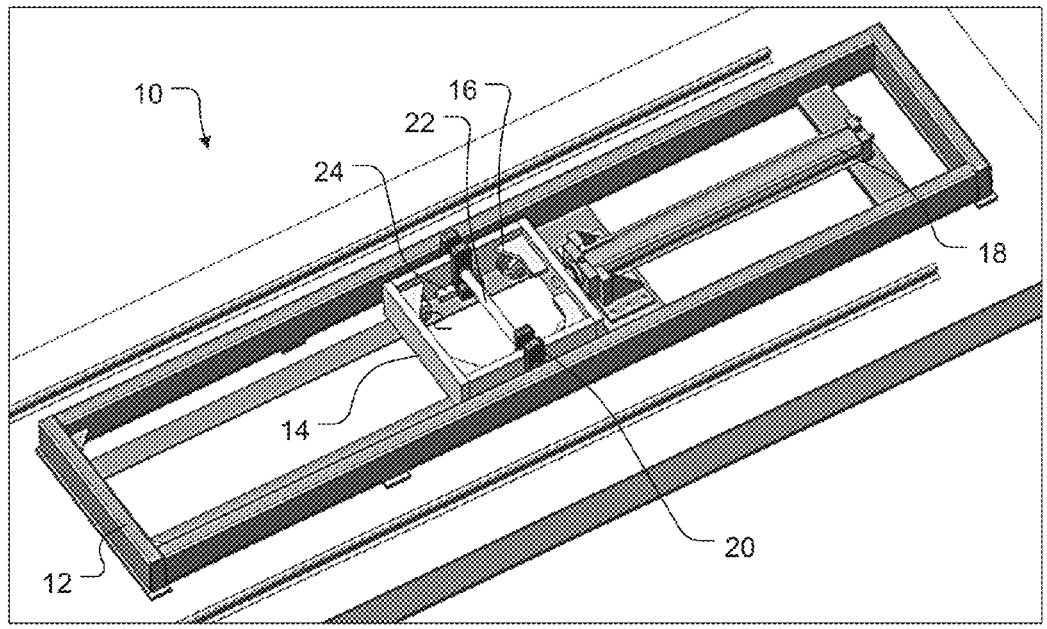
FIGS. 1A-1B are perspective views of a prior kiln pusher.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

The present disclosure describes embodiments of a pusher device for use to move trams or carts along a track. Corresponding methods and systems are also disclosed herein. In exemplary embodiments, a computing device may be endowed with one or more components of the disclosed apparatuses and/or systems and may be employed to perform one or more methods as disclosed herein.

Rail-mounted trams, or kiln carts, are often used to convey lumber through a kiln for drying. A typical tram has a pair of wheeled longitudinal supports connected by a series of transverse members mounted on the longitudinal supports at increments, with gaps between adjacent transverse members. Collectively, the transverse members form a lumber support surface.

The tram's wheels are mounted on rails that extend through the kiln. Green lumber is placed onto the transverse members of the tram, and the tram is pushed or pulled along the track through the kiln. Some facilities push the trams through the kiln in series, abutting end-to-end, using a pusher device positioned along the track upstream of the kiln entrance. One type of conventional pusher device uses a carriage with rotatable lugs to exert force against the upstream-most tram.

For the purposes of the present description, a lug has opposed faces, at least two sides that are transverse to the faces, at least one end that is transverse to the faces and sides, a pivot axis that extends through the opposed faces, and a longitudinal axis. The "cross-sectional shape" of a lug (i.e., the shape of the lug "in profile") is the shape of the outer periphery of the lug within a plane that extends through the lug normal to the pivot axis and equidistant from the opposed faces. The cross-sectional shape of a lug is generally a polygon with multiple sides, the longest of which is one "side" of the lug. If the polygon has only three sides, the second-longest side is another "side" of the lug, the last (shortest) side is one "end" of the lug, and the intersection of the longest and second-longest sides of the polygon is considered the other (or opposite) "end" of the lug. If the polygon has four or more sides, the longest side is a "side" of the lug, the sides of the polygon that are adjacent to the longest side are the "ends" of the lug, and the remaining side(s) of the polygon is/are the other "side(s)" of the lug.

Each of the sides, ends, and faces lies within a corresponding plane, and each may be either continuous (e.g., a flat uninterrupted surface) or discontinuous (e.g., textured, notched, etc.) within that plane. In other words, two or more surfaces that lie within the same plane are part of the same side, end, or face. In addition, unless stated otherwise, the cross-sectional shape of a lug is defined without reference to the shape(s) of the intersections of the sides and ends ("corners"), any or all of which may be curved/rounded, chamfered, beveled, or angular in profile. For example, a lug with parallel faces, parallel sides, and parallel ends is considered to have a rectangular cross-sectional shape, whether the corners are curved, beveled, angular, etc.

The "longitudinal axis" of a lug is defined as an axis that extends through the lug, and through the pivot axis, parallel to the longest side of the lug.

Figure 1B:
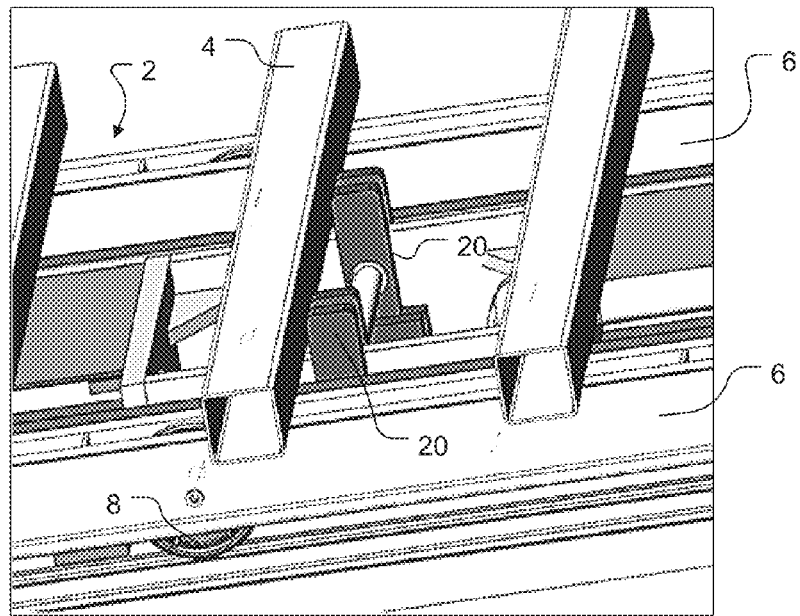

FIGS. 1A-1B illustrate a conventional pusher device 10 positioned between the rails of a track.

The conventional pusher device 10 includes a frame 12, a carriage 14 with front and rear wheels 16, and a hydraulic cylinder 18. The carriage 14 has front, side, and rear vertical walls coupled together to form a generally square frame with an open center. The rod of the hydraulic cylinder is connected to the rear wall of the carriage, and the cylinder body is coupled to a pair of elongate support plates that are in turn coupled to the side walls. Pairs of lugs 20 are rotatably mounted to the carriage on a shaft 22 that passes through the lugs and the side walls of the carriage. The lugs are rotatable in a forward direction (in the view of FIG. 1A, counter-clockwise) on the shaft from a resting position as shown to a lowered position (not shown). Stops 24 are fixedly coupled to the side walls within the frame, forward of the pivot axis of the lugs (i.e., between the front wall of the carriage and the shaft 22). Stops 24 are thus positioned to engage the front sides of the lugs near the bottom ends of the lugs to prevent backward rotation of the lugs.

The lugs of pusher device 10 are substantially rectangular in profile, with rounded corners at the intersection of the upper end and the sides. The lugs have parallel faces, parallel top and bottom ends, and parallel front and back sides that are longer than the ends. In the resting position, the lugs are upright, such the longitudinal axis and the front and rear sides of each lug are substantially vertical and the ends are vertically aligned with the pivot axis. In the lowered position (not shown), the lugs 20 are rotated forward, such that the top ends of the lugs are forward of the pivot axis and the longitudinal axis is inclined from rear to front.

The hydraulic cylinder 18 is selectively actuable to move the carriage 14 forward and backward within the frame 12 on wheels 16 to push a tram (FIG. 1B). As illustrated, a tram 2 has a pair of longitudinal supports 6 with wheels 8, and transverse members 4 arranged on the longitudinal supports to form a support surface. The transverse members 4 are substantially coplanar and positioned at regular intervals along the length of the tram. The wheels 8 of each longitudinal support engage the corresponding rail of the track.

In the resting position, the upper ends of the lugs extend into or through the plane of the transverse members 4. In the lowered position, the lugs are below the plane of the transverse members 4. The other components of carriage 14, as well as the frame 12 and hydraulic cylinder 18, remain below the plane of the transverse members regardless of the position of the lugs. The lugs are rotatable from the resting position to the lowered position by application of pressure against the rear/lagging side of the lugs.

In operation, the pusher device is positioned between the rails of the track upstream of the kiln entrance. A push cycle begins when the hydraulic cylinder 18 is extended to move the carriage 14 forward by an increment of distance. The lugs 20 are in the resting position as the carriage 14 moves forward. The forward movement of the carriage 14 brings the front sides of the lugs into engagement with the rear side of a transverse support 4 to push the corresponding tram forward. The hydraulic cylinder 18 is then retracted to move the carriage 14 backward, which brings the rear side of the lugs into contact with the front side of another transverse support 4. The force exerted against the lugs by this contact causes them to rotate forward to the lowered position, which is maintained by the contact between the rear side of the lugs and the underside(s) of the transverse support(s) as the carriage continues to move backward. When the lugs reach a gap between transverse supports, the lugs return to the resting position. The retraction of hydraulic cylinder 18 to the initial position completes one push cycle. Successive push cycles can be used to move a line of trams incrementally along the rails in an end-to-end arrangement.

This design has several disadvantages. First, if the transverse supports become warped, bent, or damaged, or if the carriage encounters debris between the rails, one of the lugs may contact the tram before the others. The resulting force may bend or break the lug. In addition, a moment developed by the hydraulic cylinder piston tends to cause the front of the carriage to lift. The resulting increase in force against the rear wheels may cause them to seize or break. In addition, damage to the wheels, uneven contact of the lugs with the trams, or debris along the track can cause lateral or twisting carriage motion, which can cause failure of the rear guide wheels, breakage of the vertical lugs at the welds, or sticking/seizing of the vertical lugs in one position.

Embodiments described herein may overcome some or all of these disadvantages of conventional pusher devices. In various embodiments, a pusher device may be configured such that when the lugs are in the resting position, the longitudinal axis of each lug is inclined or tilted forward (as opposed to vertical) to contact the tram with the front end (as opposed to a side) of the lugs. The lugs may be rotatably mounted to a carriage that is slideably mounted on linear bearings.

The lugs may have a front end, a back end, a lower side, and an upper side. The upper side may be longer than the ends and, optionally, the lower side. When the lugs are in the resting position, the upper side may be inclined from rear to front and the back end may be generally horizontal.

In some embodiments the lugs may be generally trapezoidal in profile, with neither end forming a right angle to either of the sides. In other embodiments the lugs may be generally triangular in profile, with the front end and the upper and lower sides forming the three sides of the triangle, and the intersection of the upper and lower sides considered the back end of lug. In still other embodiments the lugs may have generally the shape of a concave polygon in profile, with the front end being curved or angled in contour to define an interior angle of more than 180 degrees.

The lugs may be rotatably mounted to a pusher carriage disposed within a frame. The pusher carriage may have guide members (e.g., linear bushings or bearing carriages) that are slideable along corresponding guide rails (e.g., profile rails). A linear positioner (e.g., a hydraulic cylinder, pneumatic cylinder, roller screw, planetary screw, etc.) may be used to move the carriage forward and backward within the frame along the guide rails. In some embodiments the guide rails may be attached to an underlying support that is coupled to the frame.

In some embodiments one or more stop members may be provided rearward of the shaft/pivot around which the lugs rotate. The stop member may be positioned to engage the back end of a corresponding lug in the resting position to prevent backward rotation of the lug. Other embodiments may lack a stop member. For example, in some embodiments the lugs may be shaped and dimensioned such that the bottom sides of the lugs are in contact with the carriage while the lugs are in the resting position, preventing backward rotation of the lugs.

Configurations and features described herein may provide for reduced stress on the lugs, thereby reducing fatigue-related lug failure, in comparison to conventional configurations with vertical lugs. The rotation required for the lugs to move under the trams may be comparatively less, which may reduce sticking and/or slow return of the lugs to the resting position. The use of linear bushings/bearings instead of wheels for movement of the carriage may reduce lifting, twisting, and other non-linear carriage motion, which may help to limit the frequency and severity of damage to the lugs, carriage, and other components of the pusher device during use under harsh conditions.

FIG. 2 illustrates a perspective view of a pusher device 100, in accordance with various embodiments.

Pusher device 100 may include a frame 102, a carriage 104, a hydraulic cylinder 108 connected at opposite ends 112, 114 to the rear of the carriage and the rear of the frame, respectively, and lugs 116. Lugs 116 may be mounted to the carriage on shaft 134, such that the lugs 116 are rotatable in a forward direction.

Shaft 134 may extend through opposite sides of the carriage. As illustrated, some embodiments may have two pairs of lugs 116 arranged on opposite sides of the carriage, with the lugs of each pair positioned on opposite sides of the corresponding side wall. Other embodiments may have two, three, five, six, or more than six lugs.

Carriage 104 may have front, back, and opposed side walls joined together to form a frame. The carriage may be slideable along a pair of guide rails 130. The guide rails may help to reduce or prevent lifting, twisting, and/or lateral movements of carriage 104 that could damage components of the pusher device and cause early failure of the system. Using guide rails instead of (or in addition to) wheels may reduce or eliminate wheel failures that can occur in prior pushers operated under harsh conditions. In some embodiments, a bellows (not shown) may be provided on or over the guide rails to protect the guide rails from dirt or other debris that could otherwise stick to the guide rails.

Guide rails 130 may be mounted to the frame 102 above the underlying floor surface with mount blocks 146 that are bolted to the frame 102. The forward ends of the guide rails 130 may be retained in/through corresponding mount blocks 146 that are bolted to a front end of the frame, and the rearward ends of the guide rails 130 may be retained in/through corresponding mount blocks 146 that are bolted to the support 138. Support 138 may be rigidly attached (e.g., welded or bolted) to the frame 102. The use of mount blocks may allow for convenient disassembly of the guide rails for maintenance or replacement. Mounting the guide rails to forward end of the frame and to support 138 may reduce deflection of the guide rails during use.

Optionally, a support 140 may also be rigidly attached (e.g., welded or bolted) to the frame rearward of support 138. Supports 138 and 140 may be plates, bars, beams, or the like, made of steel or any other suitable material. The ends 114 and 112 of the hydraulic cylinder 108 may be bolted or otherwise rigidly attached to the supports 140 and 138, respectively, using one or more mount blocks, plates, or the like. As illustrated, in some embodiments the hydraulic cylinder may be coupled to support 138 by an L-shaped bracket 148 that has a vertical portion and a horizontal portion. The vertical portion may have an open-ended slot dimensioned to receive the outer body of the hydraulic cylinder, such that the hydraulic cylinder is cradled within the slot. The horizontal portion may be bolted to support 138. Optionally, the bracket may have reinforcing gussets at each side. The bracket may help to support and stabilize the hydraulic cylinder during operation while facilitating its removal for maintenance purposes.

Figure 3A:
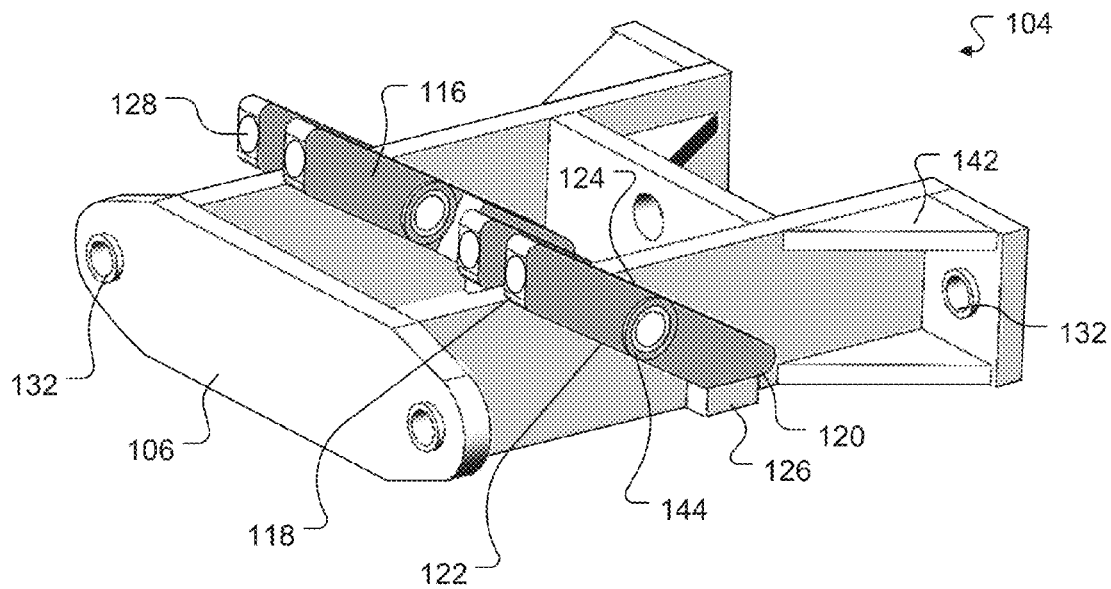
FIGS. 3A-3B are perspective and plan views, respectively, of components of a pusher device as shown in FIG. 2.
Figure 3B:
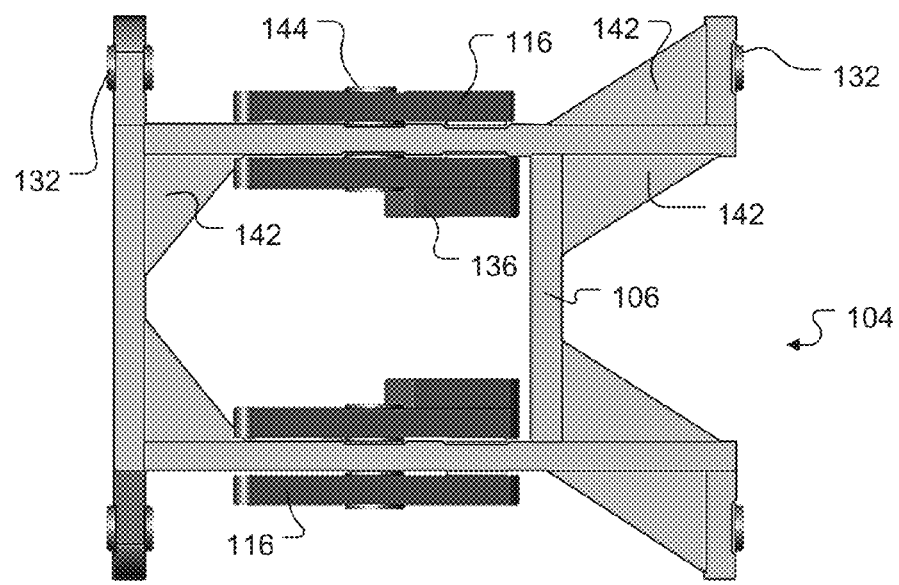

Referring now to FIGS. 3A-B, guide rails 130 may be disposed through corresponding guide members 132 in the front and rear walls of carriage 104 (see FIG. 3A). In some embodiments, guide members 132 may be linear bushings. The guide rails may be greased to aid smooth travel of the carriage on the guide rails. Optionally, carriage 104 may have reinforcing gussets 140 at some of the intersections of the front, back, and sides of carriage 104.

Lugs 116 may be rotatably mounted on shaft 134 (FIG. 2). In some embodiments, shaft 134 may be fixed relative to the carriage frame, and the lugs may be rotatable on the shaft. In other embodiments, lugs 116 may be fixed in position on shaft 134, and shaft 134 may be rotatable such that the lugs and shaft rotate as a single unit. Optionally, lug spacer rings 144 may be provided along the shaft on one or both sides of the lugs to maintain a desired spacing between lugs 116 and the sides of the carriage 104. This may facilitate cleaning and maintenance of the lugs and/or help to prevent jamming caused by lugs contacting the carriage frame.

Some embodiments may include one or more counterweights 136. Counterweight 136 may be coupled to one or more of the lugs 116 (e.g., at the back end of the lug) to aid in returning the lug(s) to the resting position.

Lugs 116 may have front and back ends 118 and 120, respectively, and upper and lower sides 122 and 124, respectively, as well as opposite faces. The lugs may be trapezoidal in shape, such that the front and back ends do not form right angles with the upper and lower sides. Upper side 122 may be longer than the front and back ends 118, 120 and the lower side 124. In some embodiments, the lug may have curved or rounded edges/corners at some or all of the intersections between the ends and the sides.

Carriage 104 may have one or more stops 126. In various embodiments, stop(s) 126 may be positioned rearward of the pivot axis of the lugs. Stop(s) 126 may be positioned to contact the back end 120 of the lugs when the lugs are in the resting position. Alternatively, stop(s) 126 may be positioned to contact the lower side 124 proximal to the back end 120 when the lugs are in the resting position. In either case, the stop(s) 126 may be configured to prevent backward rotation of the lugs from the resting position.

In some embodiments the front ends 118 and/or back ends 120 of the lugs may be provided with an elastomeric or compressible pad 128. The compressible pad may help to reduce stress concentrations on the lugs when pushing a tram that is bent or otherwise damaged.

When the lugs 116 are in the resting position, the upper and lower sides of lugs 116 may be inclined and front ends 118 may be substantially vertical. In some embodiments the back ends 120 may be substantially horizontal when lugs 116 are in the resting position.

Figure 4:
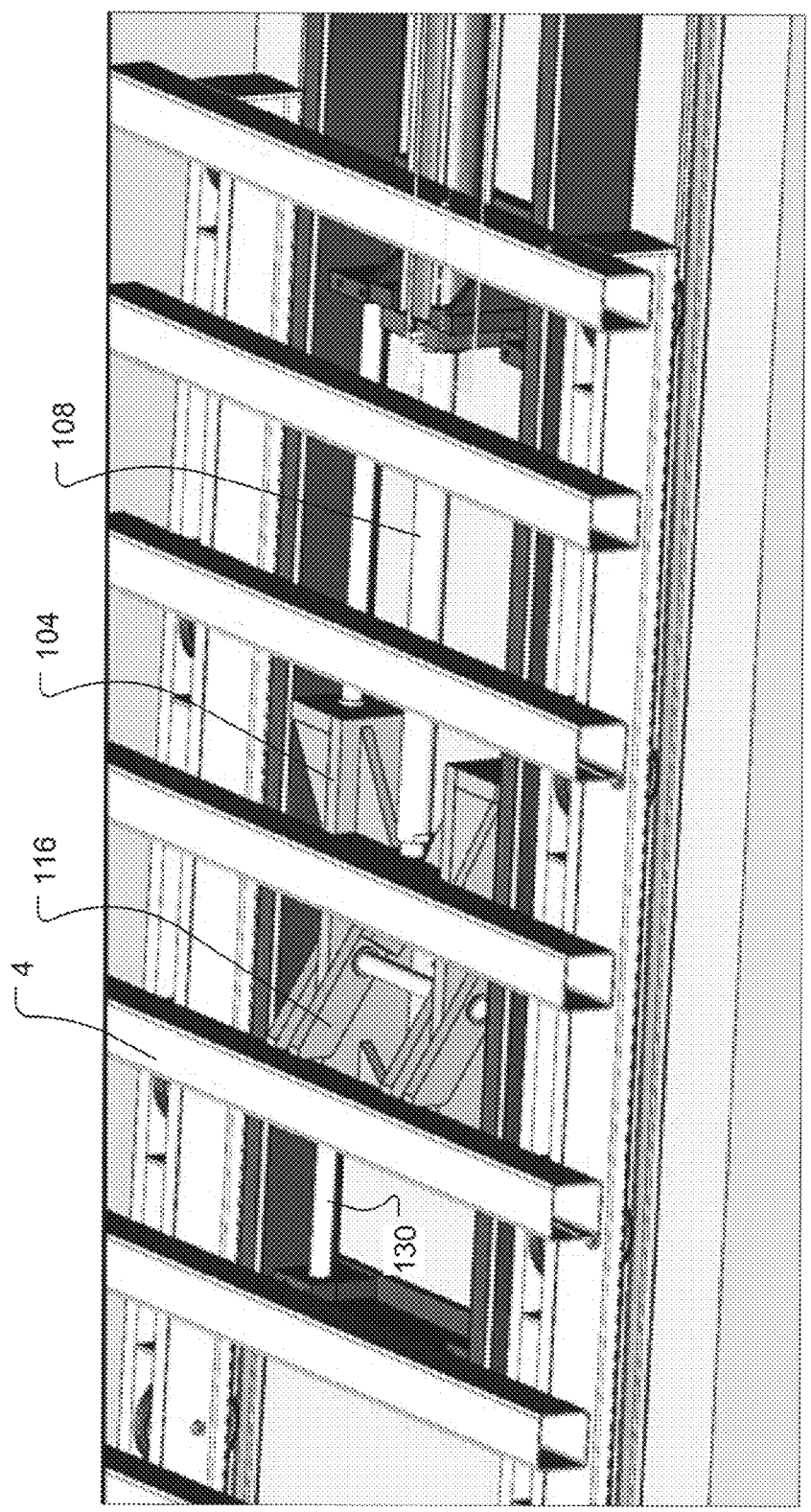
FIG. 4 is a perspective view of the pusher device of FIG. 2 in use.
Figure 5:
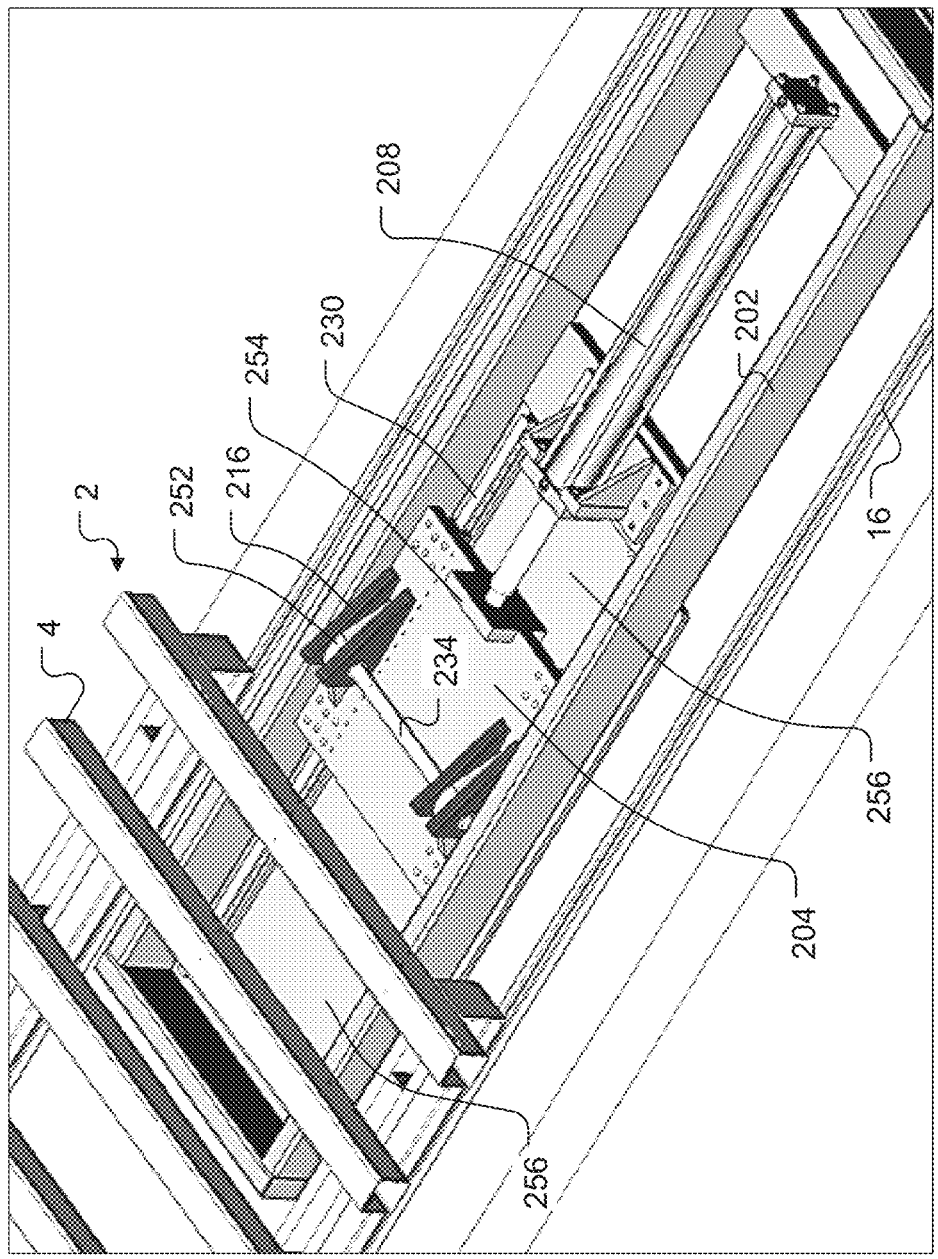
FIG. 5 is a perspective view of another embodiment of a pusher device.

Referring now to FIG. 4, the hydraulic cylinder may be actuated to push the carriage forward. As the carriage moves forward with the lugs in the resting position, the forward ends of the lugs are brought into contact with the rear surface of a corresponding transverse member 4 of a tram, and the tram is pushed forward. As the hydraulic cylinder is retracted and the carriage is moved backward, the upper side 122 of the lugs contacts the leading edge of the next successive transverse member 4. The lugs are rotated forward to the lowered position by the engagement of the upper side 122 with the underside of the transverse member. Once the lugs have passed beneath the transverse member, they begin to rotate back to the resting position.

FIGS. 5-9 illustrate perspective views of another example of a pusher device 200 and components thereof, in accordance with various embodiments. Elements that generally correspond to elements of FIGS. 2-4 are indicated with like reference characters.

Pusher device 200 may have a frame 202, a carriage 204, a linear positioner (e.g., a hydraulic cylinder) 208 connected at opposite ends to the rear of the carriage and the rear of the frame, respectively, and lugs 216.

The frame 202 may have generally vertical front, rear, and side walls. The linear positioner/hydraulic cylinder 208 may be coupled with the frame via supports 238 and 240 and bracket 248 in the same or similar manner as described above. In addition, a plate 256 may be welded or otherwise rigidly attached to the frame. Plate 256 may be a sheet of steel or other such material. Optionally, plate 256 may extend below both side walls of the frame 102, and/or from the front end of the frame to the body of the linear positioner 208.

Carriage 204 may include a carriage plate 250, brackets 252, and a cylinder mount 254. In some embodiments carriage plate 250 may be a plate of steel or other such material. Cylinder mount 254 may be disposed at the back end of plate 250 and the brackets 252 may be disposed on the upper surface of plate 250. Brackets 252 and cylinder mount 254 may be coupled to the plate 250 by welds, bolts, or the like. Optionally, the carriage plate and the cylinder mount and/or brackets may have complementary notches, slots, or the like, along which these components are fitted together.

Figure 6:
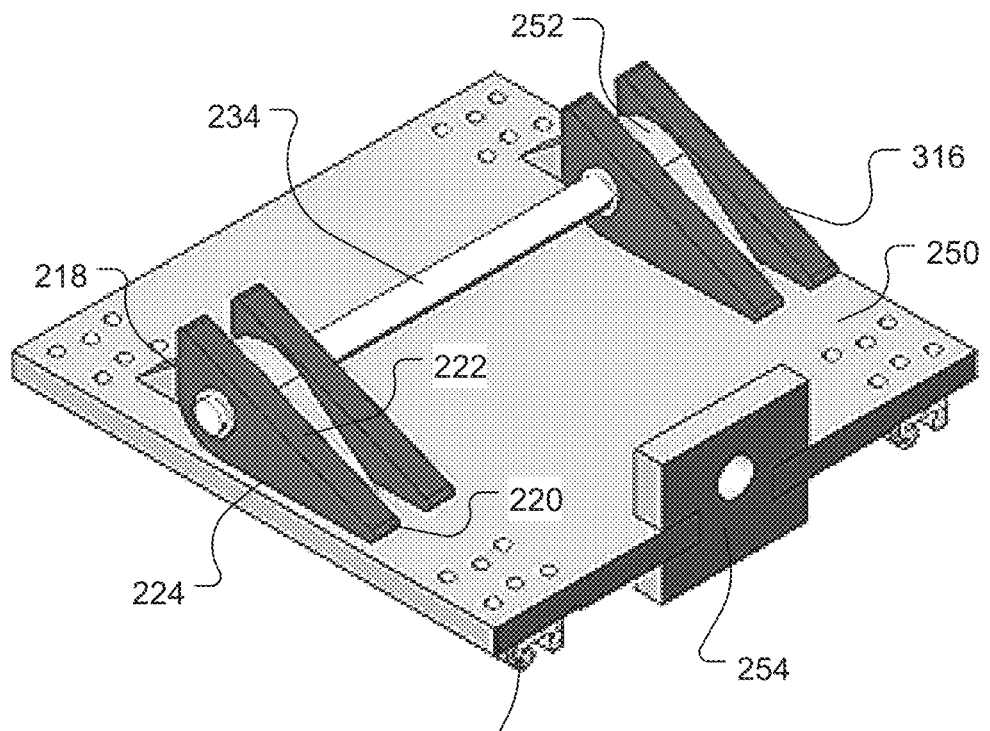
FIGS. 6 and 7 are perspective views of components of a pusher device as shown in FIG. 6.
Figure 7:
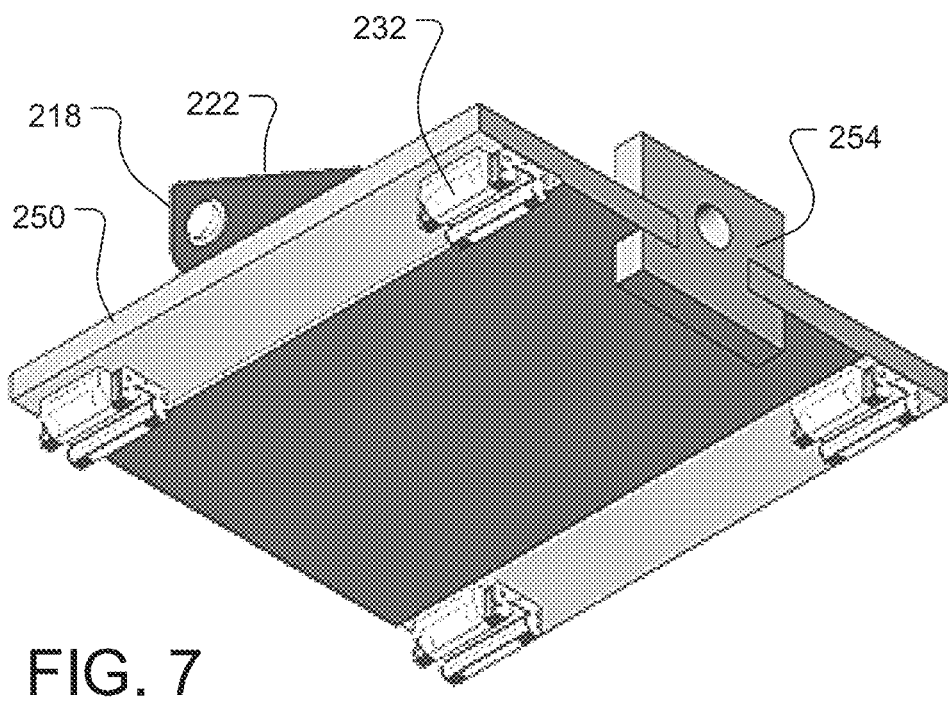
Figure 8:
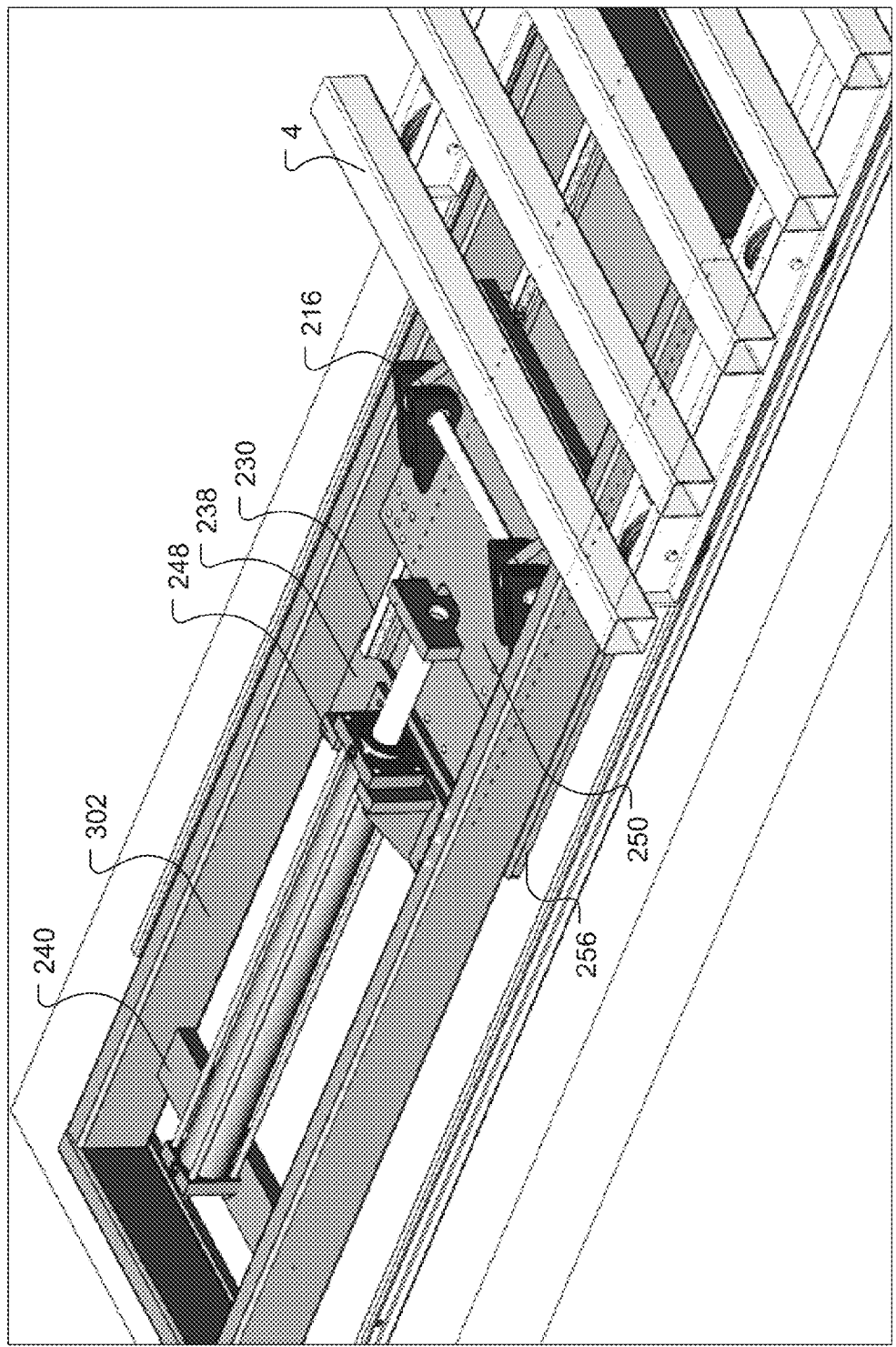
FIG. 8 is a perspective view of the pusher device of FIG. 6 in use.

Guide rails 230 may be affixed to the rail plate 256 (FIG. 5), and corresponding guide members 232 may be affixed to the bottom surface of carriage plate 250, with welds, bolts, or other suitable fasteners (FIGS. 6-7). In a particular example, the guide members 232 are Rexroth 55 mm roller blocks, and the guide rails 230 are Rexroth 1845 size 55 rails. Alternatively, other suitable sizes and/or types of linear motion bearings may be used instead.

Referring now to FIGS. 6-7, lugs 216 may be arranged along shaft 234, which may extend through the brackets 252. A pair of lugs and a corresponding bracket may be provided on both sides of the carriage. The lugs of each pair may be positioned on opposite sides of the corresponding bracket 252.

Lugs 216 may be generally triangular in shape, with the front end 218, upper side 222, and lower side 224 as the three sides of the triangle. The intersection of the upper and lower sides 222 and 224 may be the back end 220. The upper side may be longer than the lower side and the front end. As best illustrated in FIG. 6, the lugs may be curved at the intersection of the front end 218 and the lower side 224. In the resting position (shown), the front end 218 may be substantially vertical, the lower side 224 may be substantially horizontal, and the upper side 222 may be inclined from rear to front. The thickness of the lugs (distance between the opposed faces) may vary among embodiments. In some embodiments, lugs 216 may be 1-3 inches thick. In a particular example, lugs 216 are approximately 2 inches thick.

The number and arrangement of the lugs and brackets 252 may vary among embodiments. As shown by way of example in FIG. 9, in some embodiments the carriage may have additional brackets 252, such that each lug is disposed between two brackets. Other embodiments may have one or more additional brackets and/or lugs located nearer to the center of the carriage or the shaft.

Figure 9:
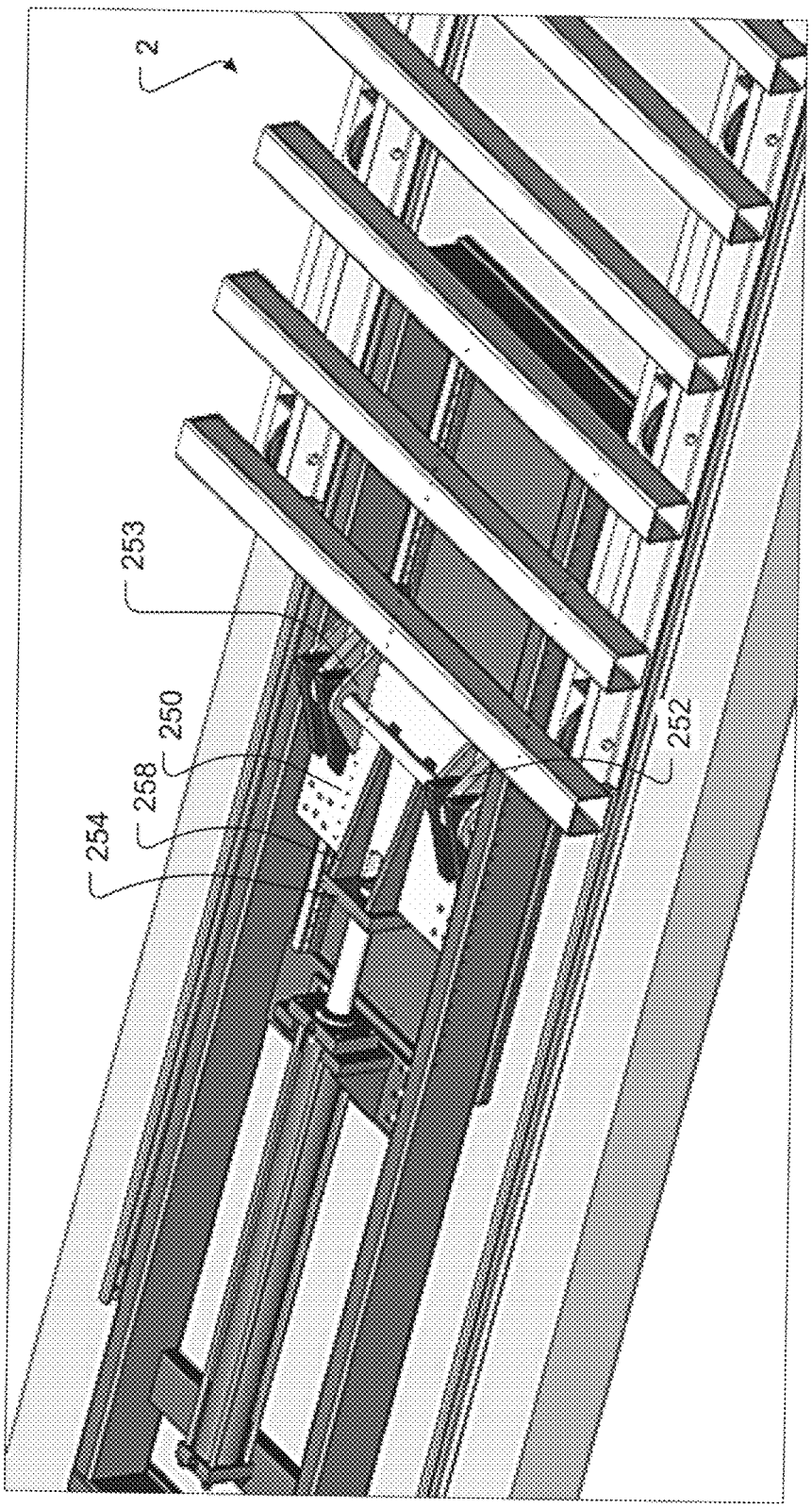
FIG. 9 is a perspective view of another embodiment of a pusher device in use.

Optionally, pusher device 200 may further include various other features (e.g., lug spacer rings, gussets, elastomeric pads, guide rail protective bellows, etc.) described above with regard to pusher device 100. For example, as shown in FIG. 9, in some embodiments carriage 204 may include gussets 258 connected to the upper surface of the carriage plate 250 and the forward surface of the cylinder mount 254.

Figure 10:
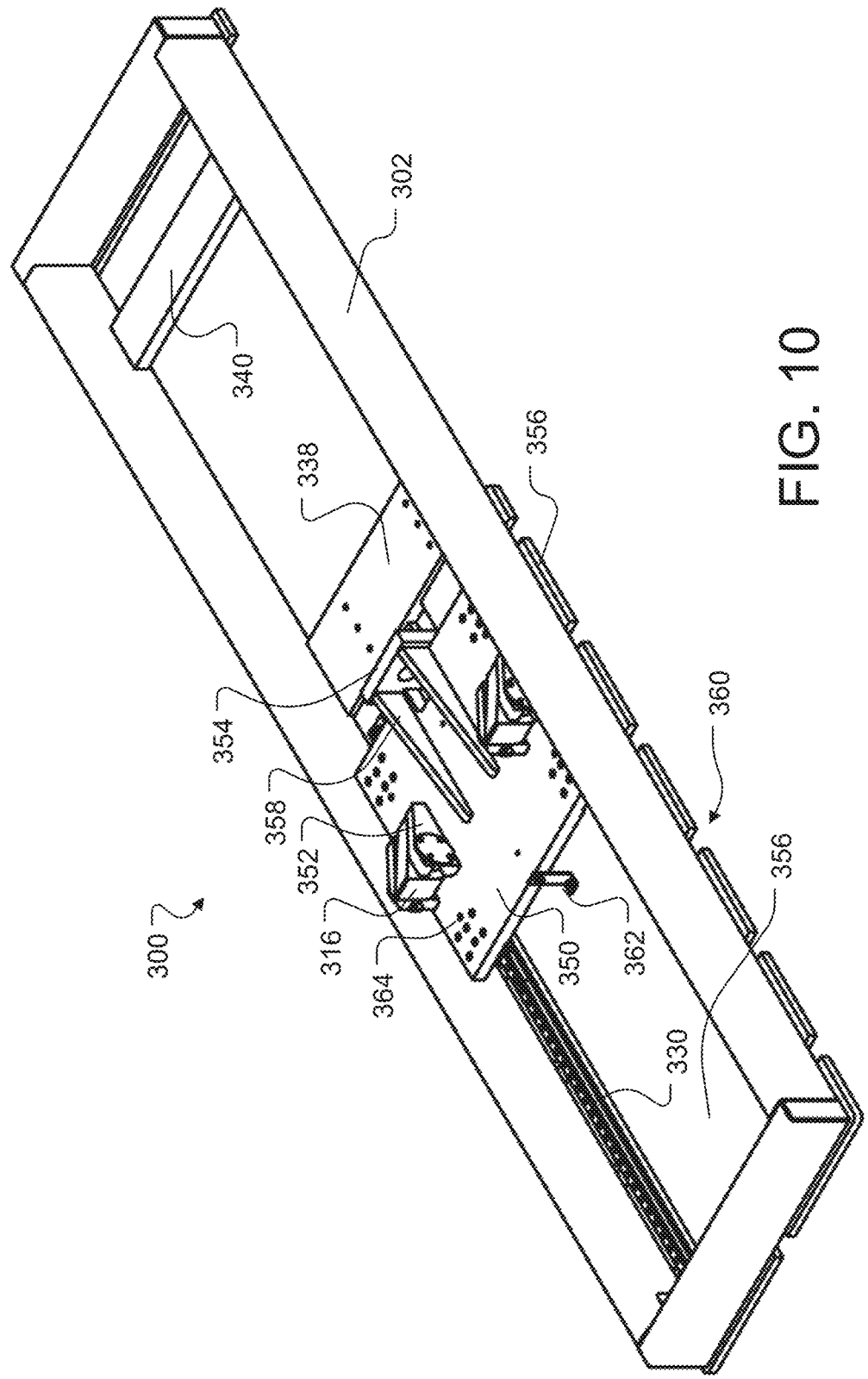
FIG. 10 is a perspective view of another embodiment of a pusher device.

Another example of a pusher device is shown in FIGS. 10-13. Referring first to FIG. 10, pusher device 300. Again, elements that generally correspond to elements of FIGS. 2-9 are indicated with like reference characters.

Pusher device 300 may have a frame 302 and a carriage 304. A linear positioner (not shown) may be connected at opposite ends to the rear of the carriage and the rear of the frame, respectively.

Again, the frame 302 may have generally vertical front, rear, and side walls. Supports 338 and 340 and the linear positioner may be coupled with the frame in the same or similar manner as described above.

A plate 356 may be welded or otherwise rigidly attached to the frame. Plate 356 may be a sheet of steel or other such material. Again, plate 356 may be coupled to the underside of the frame and extend below both side walls of the frame. However, plate 356 may have a series of open-ended slots 360 around the outer edge thereof (see also FIG. 12A). The slots 360 may extend inwardly toward a longitudinal center of the frame, passing beyond the vertical walls of the frame.

This configuration may allow drainage of water or other fluids through the plate 356. Alternatively, plate 356 may be provided with interior holes to provide drainage.

Optionally, a removable bracket 262 may be coupled with the forward end of carriage plate 350 and plate 356 by bolts or the like. Bracket 262 may be used to secure carriage plate 350 in place for shipping and/or during maintenance, and removed before resuming operation of the pusher device.

Carriage 304 may include a carriage plate 350, brackets 352, and a cylinder mount 354. In some embodiments carriage plate 350 may be a plate of steel or other such material. Cylinder mount 354 may be disposed at the back end of plate 350 and the brackets 352 may be disposed on the upper surface of plate 350. Brackets 352 and cylinder mount 354 may be coupled to the plate 350 by welds, bolts, or the like. Again, the carriage plate and the cylinder mount and/or brackets may have complementary notches, slots, or the like, along which these components are fitted together, and/or reinforcing gussets 358. In some embodiments carriage plate 350 may include one or more grease fitting ports 364. A grease fitting/zerk fitting may be disposed within each port 364.

Figure 11B:
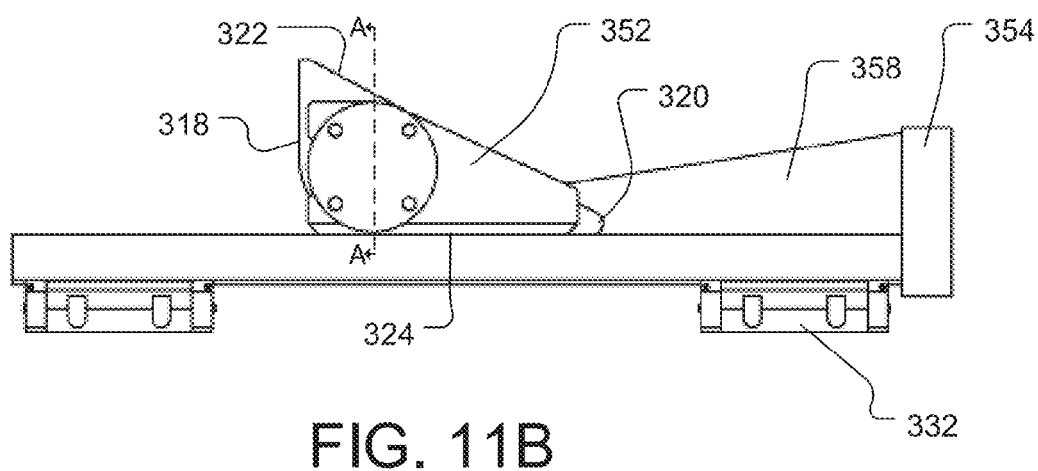
FIGS. 11B-C are side and rear elevational views of components shown in FIG. 11A.
Figure 11C:
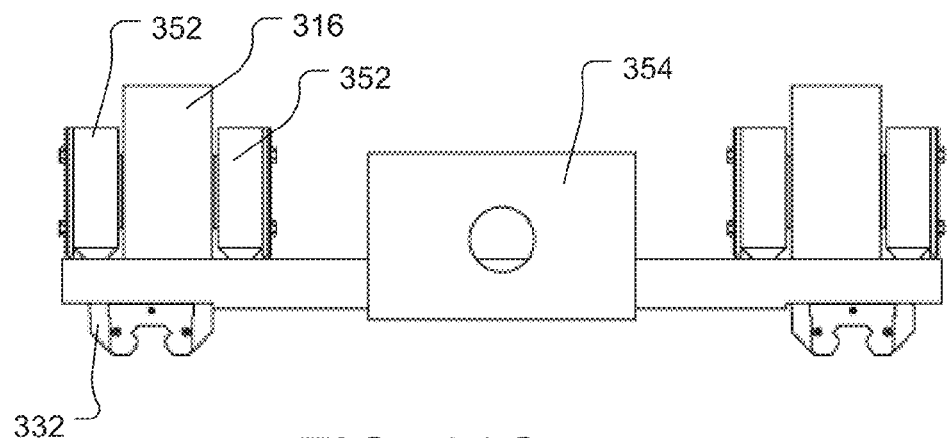

Guide rails 330 may be affixed to the rail plate 356 (FIG. 10). Referring now to FIGS. 11A-C, corresponding guide members 332 may be affixed to the bottom surface of carriage plate 350 (e.g., with bolts or other suitable fasteners). In some embodiments, guide members 332 and guide rails 330 may be linear recirculating roller bearing and guideway assemblies. For example, guide members 332 may be INA double sealed roller guide carriages with anti-corrosion coating, and guide rails 330 may be corresponding INA 55 mm profile rails with brass closure plugs. Alternatively, any other suitable size or type of linear motion bearing may be used instead.

Figure 11D:
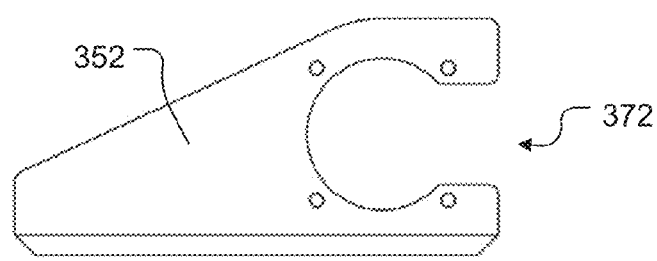
FIGS. 11D-E are additional side elevational views of components shown in FIG. 11A.

A pair of brackets 352 may be provided on opposite sides of the upper surface of carriage plate 350. Optionally, the brackets may be constructed with chamfered lower surfaces and welded to the carriage plate to fill the chamfer with weld. In some embodiments, brackets 352 may have an open-ended slot 372 (FIG. 11D).

A lug 316 may be disposed between the brackets of each pair. Lugs 316 may be generally triangular in shape, with the front end 318, upper side 322, and lower side 324 as the three sides of the triangle and the intersection of the upper and lower sides 222 and 224 forming back end 220. The upper side may be longer than the lower side and the front end, and the lugs may be curved at the intersection of the front end 318 and the lower side 324. In the resting position (shown), the front end 318 may be substantially vertical, the lower side 324 may be substantially horizontal, and the upper side 322 may be inclined from rear to front.

Figure 11E:
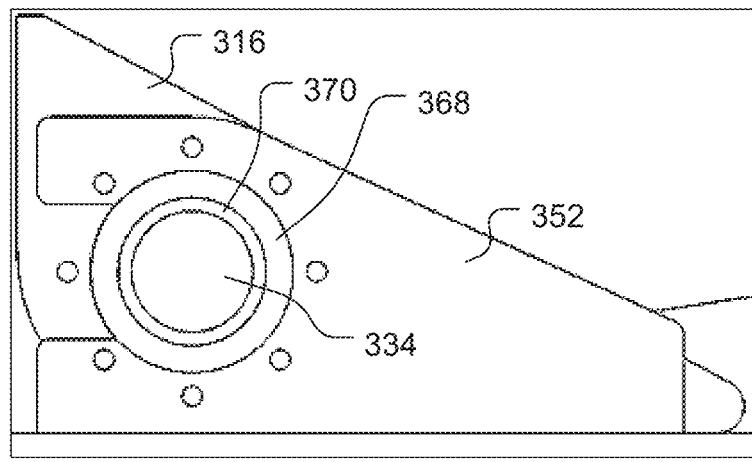
Figure 11F:
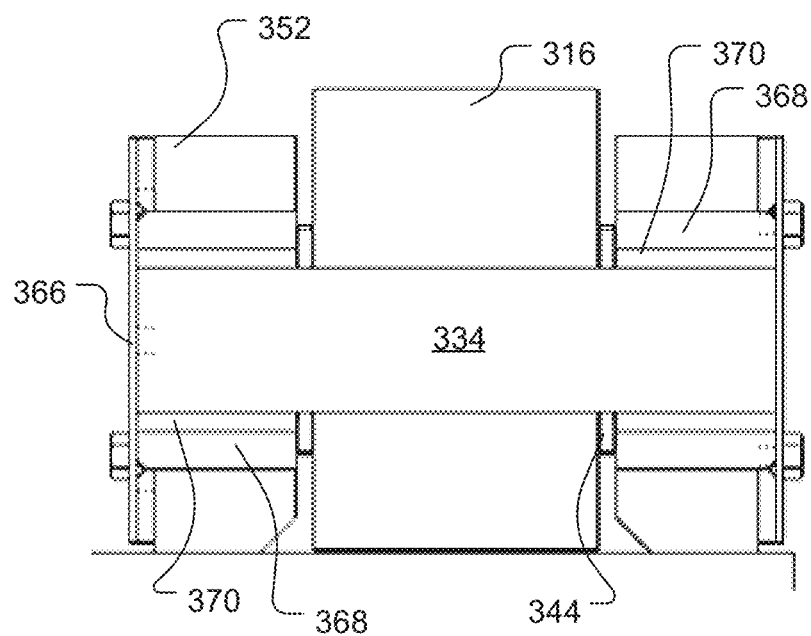
FIG. 11F is a schematic sectional view of some of the components shown in FIG. 11B, taken along lines A-A of FIG. 11B.

FIGS. 11E-F show additional details of the bracket and lug configuration. As best illustrated in FIG. 11F, which shows a sectional view taken along a vertical plane that passes through the center of the pivot axis of the lugs, brackets 252 may be provided with bushing sleeves 368. Corresponding bushings 370 may be disposed within the bushing sleeves. In some embodiments, bushings 370 may be self-lubricating bushings. In other embodiments, bushings 370 may be pre-lubricated bushings, metallic bushings, composite bushings, or any other suitable type of bearing. A shaft 334 may extend through the bushings 370 and lug 316. Another shaft 334 may extend through the bushings and lug on the opposite side of the carriage. A retaining flange 366 may be provided at each end of each shaft.

Again, the number and arrangement of the lugs 316 and brackets 352 may vary among embodiments. Optionally, the lugs 316 may be more than three inches thick. For example, the lugs may be approximately 4 inches thick, or 3-5 inches thick.

Figure 13:
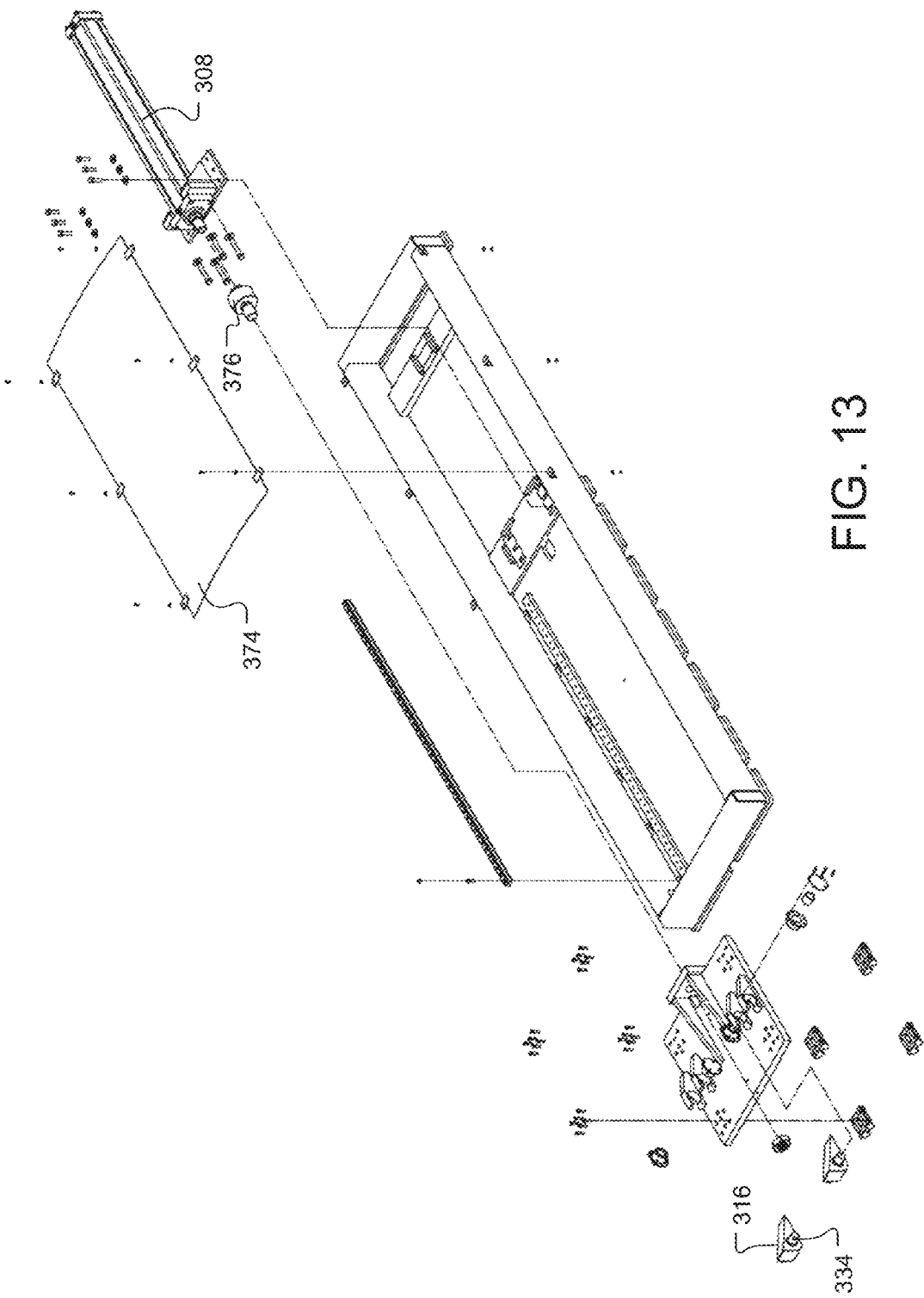
FIG. 13 is an exploded view of a pusher device as shown in FIG. 10.
Figure 14:
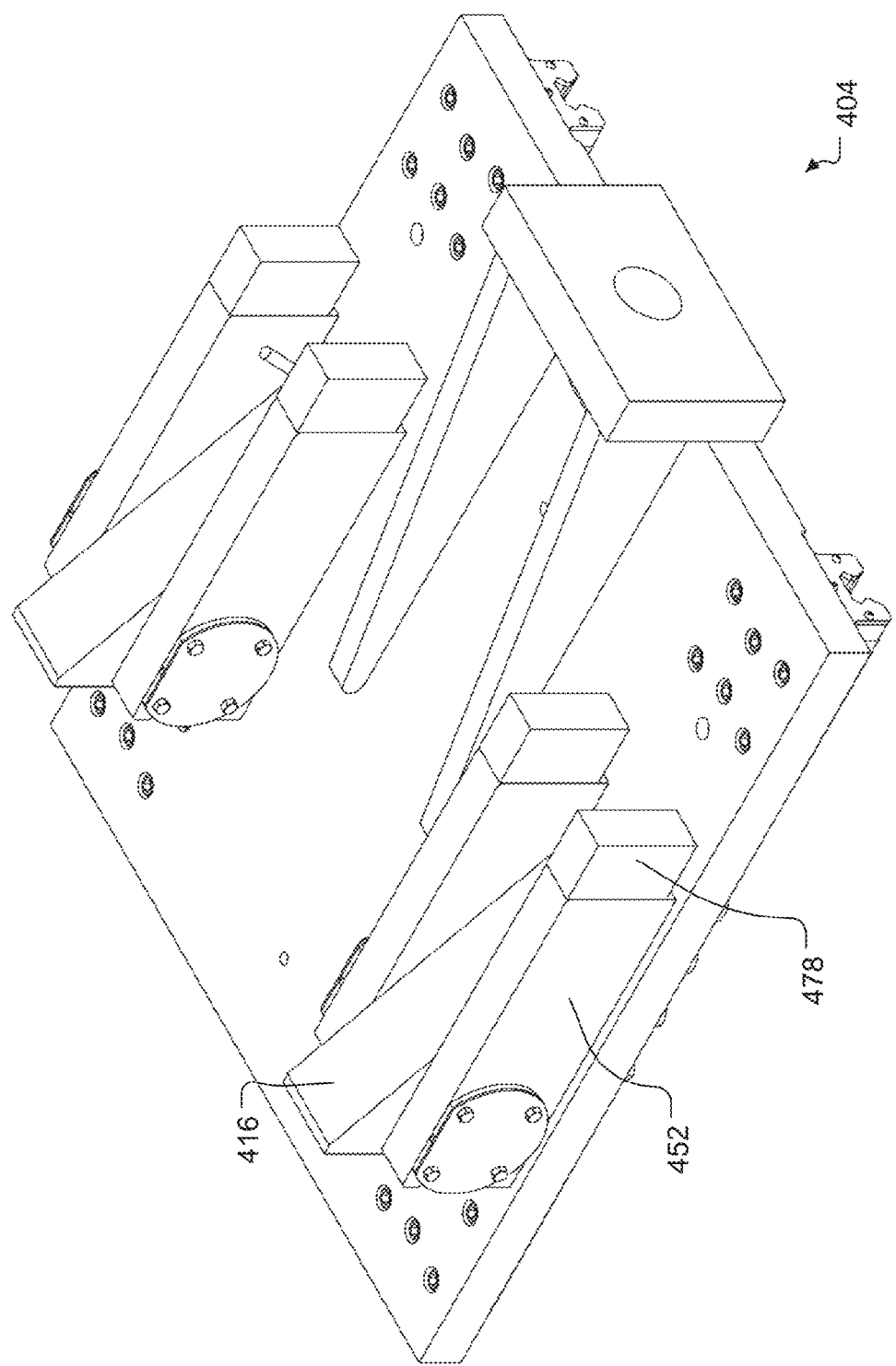
FIG. 14 is a perspective view of an alternative embodiment of a pusher device carriage.
Figure 15:
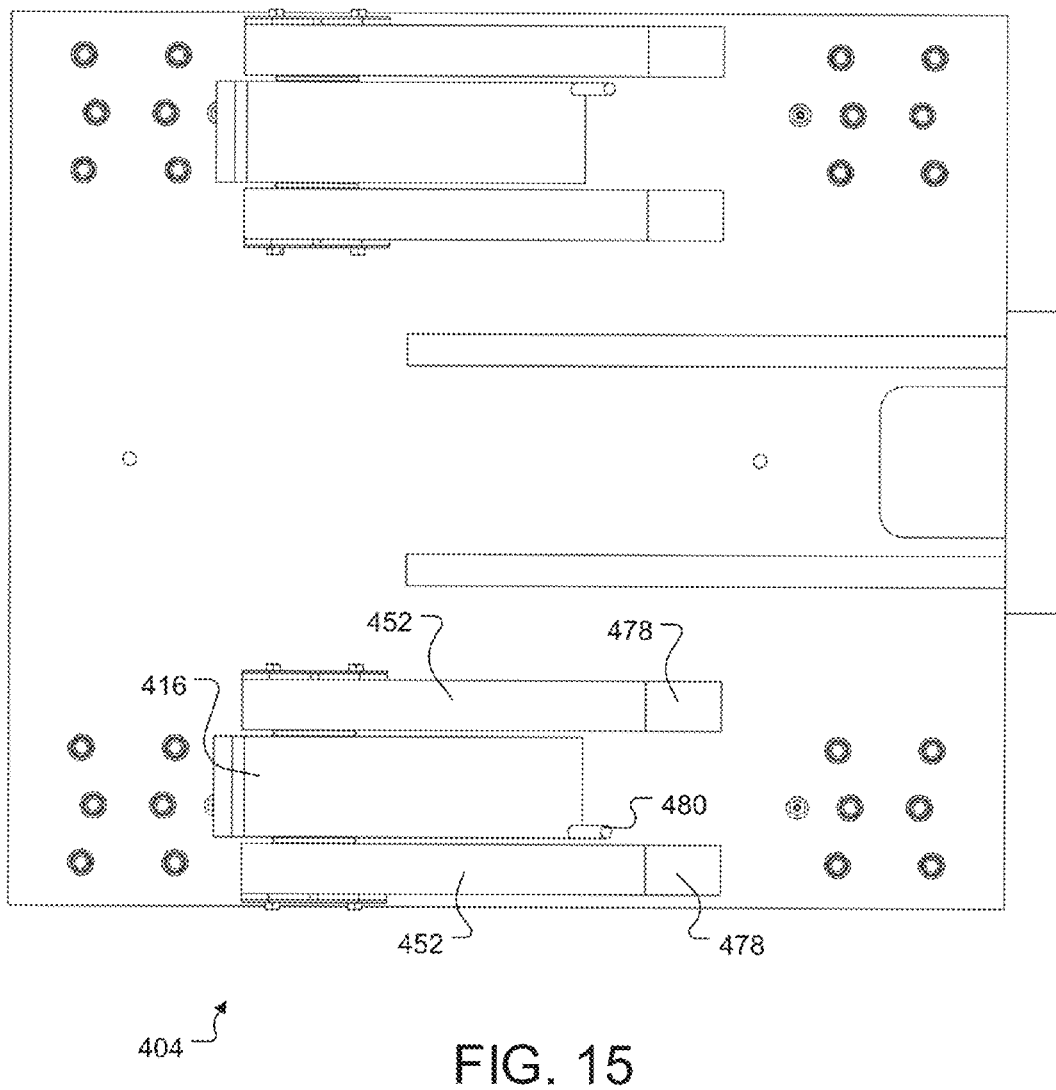
FIG. 15 is a plan view of the pusher device carriage of FIG. 14.

FIG. 13 is an exploded view of a pusher device as shown in FIG. 10. In some embodiments, a pusher device may include a cover 374, such as a sheet of metal or other durable material, configured to cover the linear positioner 308 during use. The cover 374 may be removably coupled to the frame 302 with bolts, screws, brackets, or with any other suitable type of fastener.

Some pusher devices may include a linear alignment coupler 376 coupled to the front end/rod of linear positioner 308. The use of a linear alignment coupler may reduce wear on linear positioner 308 and/or components thereof. Other embodiments may lack linear alignment coupler 376.

Optionally, a shaft 334 and corresponding lug 316 may be provided as a unitary component. For example, the shaft may be press-fitted through the corresponding lug. Alternatively, the shaft and lug may be welded together. In other embodiments, the shaft and lug may be provided as separate components.

The shapes and dimensions of the lugs and brackets may vary among embodiments. For example, FIGS. 14-15 and 16A-B illustrate a carriage 404 with brackets 452 that are generally rectangular. Optionally, brackets 452 may extend toward the back of the carriage 452 beyond the back ends of lugs 416. Carriage 404 may further include supports 478 affixed to the upper surface of the carriage plate 450. Each support 478 may be, or may include, a block or plate positioned in contact with the back end of a corresponding bracket 452. In some embodiments, supports 478 may be constructed with a chamfered lower edge and welded to the carriage plate 450 such that the chamfer is substantially filled.

Figure 16A:
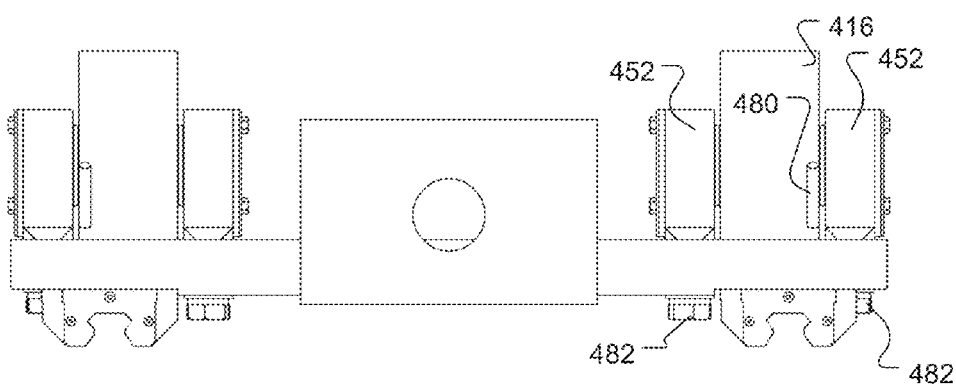
FIGS. 16A-B are rear elevational and side elevational views, respectively, of the pusher device carriage of FIG. 14.
Figure 16B:
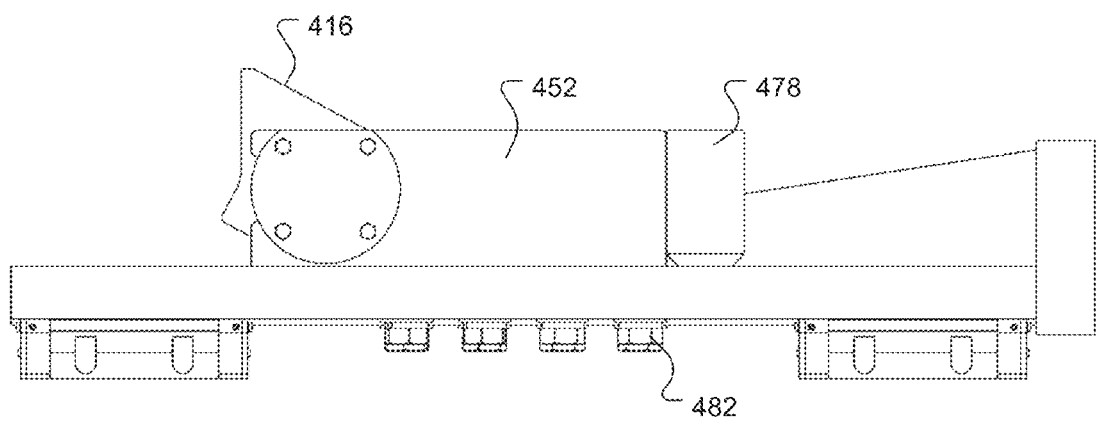

Brackets 452 may be removably coupled to the carriage plate 350 with bolts 482 (FIGS. 16A-B). Removably coupling the brackets to the carriage plate may allow damaged or worn brackets to be replaced, and/or allow the brackets and corresponding lug to be removed as a single unit. Supports 478 may help to reinforce the brackets, and may serve as alignment guides for installing or replacing the brackets.

In some embodiments a lug may have two ends and more than two sides. Some lugs may have the shape of a concave polygon in profile. Others may have the shape of a convex polygon in profile. Again, any or all of the intersections between two sides or an end and a side may be angled or curved, chamfered, beveled, or the like.

Figure 17A:
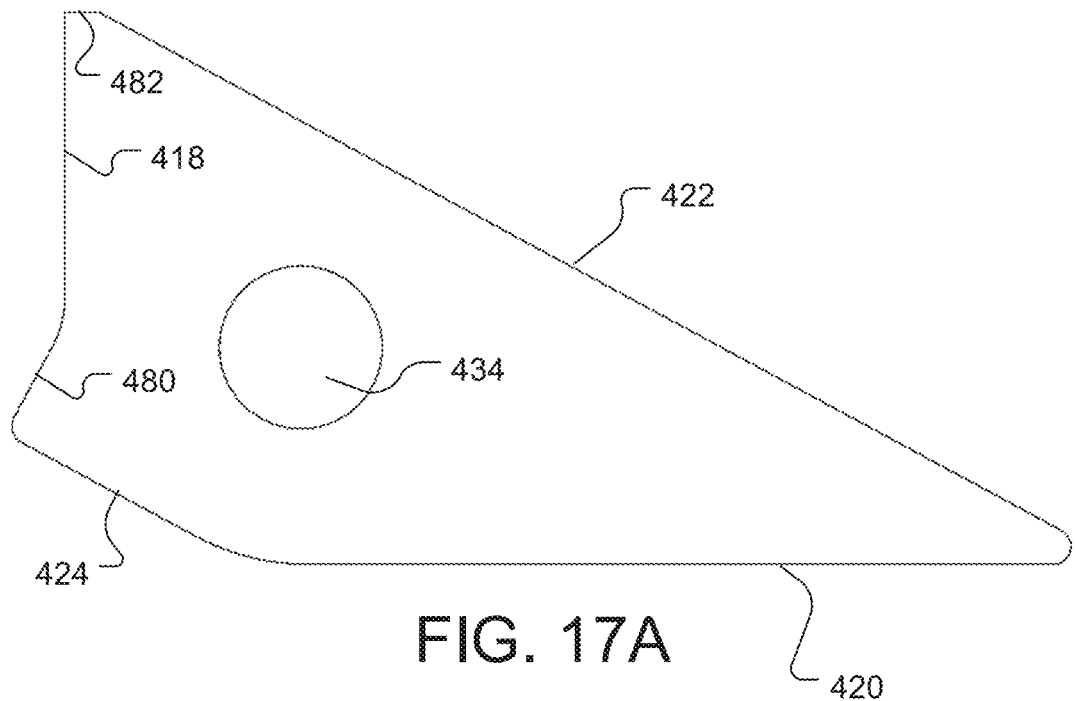
FIGS. 17A-B are side elevational and perspective views, respectively, of components of a pusher device, all in accordance with various embodiments.
Figure 17B:
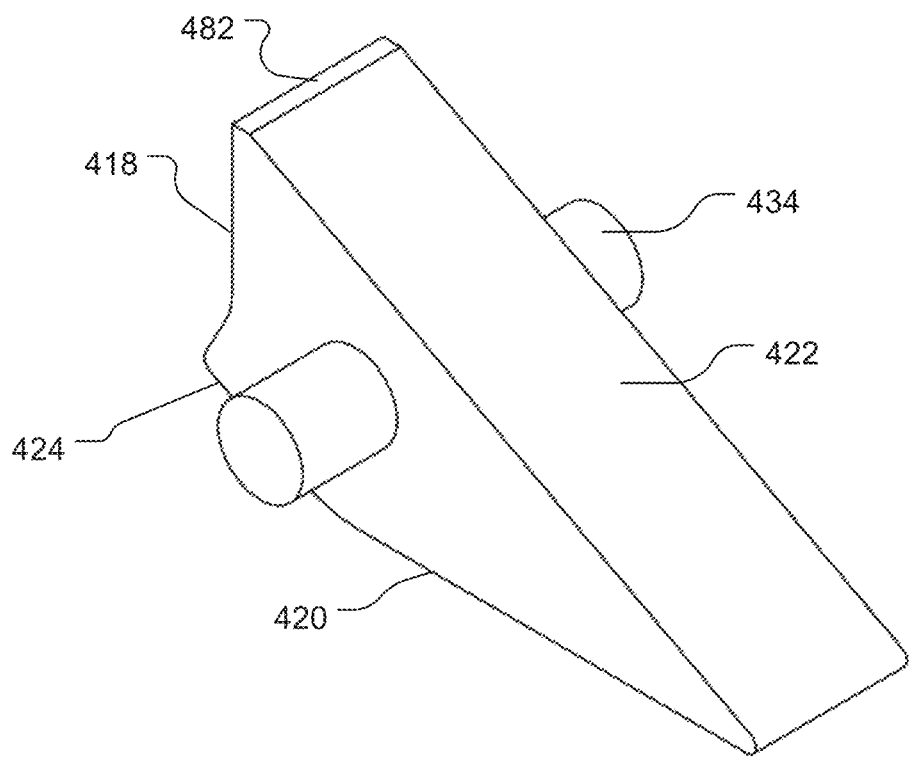

A lug with a concave polygon cross-sectional shape/profile is illustrated by way of example in FIG. 17A. Lug 416 may have a front end 418, a back end 420, an upper side 422, a lower side 424, and a third side 480. Front end 418 and third side 480 may form an interior angle of more than 180 degrees. For example, they may form an interior angle of 190-230°, 200-220°, 205-212°, or about 208°. Optionally, the upper side 422 and the bottom side 424 may be generally parallel to one another. Lower side 424 and third side 480 may form an angle of 80-100°, or 85-95°, 88-92°, or about 90°. Lower side 424 and back end 420 may form an interior angle of 140-160°, 145-155°, 150-154°, or about 152°. Any or all of the corners (e.g., corner 482 of upper side 422 and front end 482) may be curved, rounded, beveled, etc.

In the resting position, the back end 420 of the lug 416 may rest on a surface of the carriage plate 450, preventing further backward rotation of the lug. When the lug is rotated forward to the lowered position, lower side 424 may rest on another surface of carriage plate 450, preventing further forward rotation of the lug. As such, carriage plate 450 may lack stop members. Optionally, carriage plate 450 may have replaceable plates/pads at some or all of the surfaces contacted by an end or side of the lugs to thereby reduce wear on the carriage plate and/or lugs, or to facilitate smooth motion of the lugs.

Again, shaft 434 may be press fitted or welded to the corresponding lug 416, or rigidly affixed thereto by any other suitable means.

A pusher device may have any of the features (e.g., lug spacer rings, gussets, elastomeric pads, guide rail protective bellows, etc.) of any of the embodiments described herein, in any suitable combination.

In some embodiments, an existing pusher device may be modified by replacing the carriage, lugs, wheels, and/or other existing components with components of pusher devices as described herein. For example, pusher device 10 could be modified by removing the existing carriage, coupling guide rails (and optionally a rail plate) to the frame of the existing pusher device, and coupling a pusher carriage as described herein to the guide rails and the existing hydraulic cylinder. Alternatively, pusher device 10 could be modified by replacing the lugs with lugs as described herein (either on the existing shaft or on separate shafts) and reinstalling the stop members rearwardly of the pivot axis of the lugs, and/or replacing the wheels with linear bearings coupled to the existing carriage and existing frame. In any case, existing components such as the frame, hydraulic cylinder and hydraulic system may be reused for a more cost-efficient upgrade of an existing pusher device.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A pusher device, comprising:
    a carriage having a carriage frame and at least one pair of guide members fixedly coupled to the carriage frame, the guide members configured to slideably engage a corresponding pair of guide rails to thereby guide the carriage along a substantially linear path of travel, wherein the carriage frame has a top, a bottom, and opposite sides, and the guide members are oriented substantially parallel to said path; and
    a first lug rotatably mounted to the carriage such that the first lug is rotatable, relative to the carriage, between a resting position and a lowered position,
    wherein the first lug has a pair of opposed faces, an axis of rotation that extends through the opposed faces, at least a first side and a second side that are transverse to the opposed faces and to one another, and at least a first end that adjoins the first side and is transverse to the faces and the sides, the first side being longer than the second side and the first end, and
    wherein the first lug is configured to rotate from the resting position to the lowered position in response to force applied in a first direction against, the first side, and to remain in the resting position while force is applied in an opposite second direction against the first end, and
    wherein the first side is inclined and the first end is substantially vertical when the first lug is in the resting position.

2. The pusher device of claim 1, further including a second lug rotatably mounted to the carriage, wherein the first and second lugs are mounted on the carriage frame on opposite sides of a centerline that extends through the carriage frame parallel to said path.

3. The pusher device of claim 2, wherein the first lug has a cross-sectional shape, within a plane that is normal to the pivot axis and equidistant between said faces, which is generally polygonal with at least one rounded corner.

4. The pusher device of claim 3, wherein the cross-sectional shape of the first lug includes at least one interior angle greater than 180°.

5. The pusher device of claim 4, wherein the first lug further includes a second end and a third side, the first end and the third side are upstream of the axis of rotation, and the at least one interior angle is an interior angle formed by the first end and the third side.

6. The pusher device of claim 5, wherein the first and second are substantially vertical and horizontal, respectively, when the first lug is in the resting position.

7. The pusher device of claim 3, wherein the cross-sectional shape of the first lug is generally triangular.

8. The pusher device of claim 7, wherein the rounded corner is at the intersection of the first end and the second side.

9. The pusher device of claim 8, wherein the first end and the second side are substantially vertical and horizontal, respectively, when the first lug is in the resting position.

10. The pusher device of claim 2, wherein the carriage frame includes a generally horizontal plate with first and second brackets coupled an upper surface of the plate, and the first lug is rotatably coupled to the plate by a shaft disposed through at least the first bracket.

11. The pusher device of claim 10, wherein the lug is configured to contact the top of the carriage frame with the second side or the first end of the lug when the lug is in the resting position.

12. The pusher device of claim 10, wherein the first lug is disposed between the first and second brackets, and the shaft is disposed through the first and second brackets.

13. The pusher device of claim 12, wherein the shaft is press fitted through the first lug.

14. The pusher device of claim 12, wherein the first and second brackets have corresponding bushings disposed within bushing sleeves, and the shaft is disposed through the bushings.

15. The pusher device of claim 14, wherein the bushings are self-lubricating bushings.

16. The pusher device of claim 10, further including a generally rectangular pusher frame with generally vertical front, side, and end walls, wherein the guide rails are coupled with the pusher frame and oriented generally parallel to the end walls, and the guide members are slideably coupled to the guide rails.

17. The pusher device of claim 16, further including a generally planar plate extending between the side walls of the pusher frame, wherein the guide rails are mounted to an upper surface of the plate.

18. The pusher device of claim 2, wherein the guide members are roller guide carriages, and the guide rails are profile rails.

19. The pusher device of claim 18, wherein the carriage frame comprises a generally planar carriage plate, the guide members are coupled to an underside of the carriage plate, and the first and second lugs and the brackets are disposed on an upper side of the carriage plate.

20. The pusher device of claim 19, wherein the brackets are coupled to the carriage plate by corresponding bolts that extend through the carriage plate.

21. A pusher system, comprising the pusher device of claim 16 and a linear positioner coupled to the carriage and the pusher frame, wherein the linear positioner is operable to move the carriage along the path of travel on the guide rails.

22. The pusher system of claim 21, wherein the linear positioner includes a hydraulic cylinder.

23. A method of modifying an existing pusher device, wherein the existing pusher device includes an existing pusher frame with front, rear, and side walls, the method comprising:
coupling a pair of guide rails to the existing pusher frame between and generally parallel to the side walls;
slideably coupling a carriage with the guide rails, wherein the carriage includes a carriage frame with at least a first lug rotatably mounted to the carriage frame such that the first lug is rotatable between a resting position and a lowered position, the first lug having opposed faces, first and second sides and a first end that are transverse to the faces and to one another, a pivot axis that extends through the faces, and a longitudinal axis that extends through the pivot axis parallel to the longest of the sides; and
coupling a linear positioner to the carriage and the pusher frame, such that the linear positioner is operable to move the carriage along the guide rails.

24. The method of claim 23, further including coupling a generally planar plate to two or more of the walls of the existing pusher frame, wherein coupling the guide rails to the existing frame includes attaching the guide rails to an upper surface of the plate.

25. The method of claim 23, wherein slideably coupling the carriage with the guide rails includes attaching guide members to an existing carriage of the existing pusher device and coupling the guide members with the guide rails, wherein the guide members are configured to slideably engage the guide rails.

26. The method of claim 23, wherein the carriage frame includes a generally planar carriage plate, and wherein slideably coupling the carriage with the guide rails includes attaching guide members to an underside of the carriage plate and coupling the guide members with the guide rails, wherein the guide members are configured to slideably engage the guide rails.

27. The method of claim 26, further comprising coupling at least one pair of brackets to an upper surface of the carriage plate and rotatably mounting the first lug to the brackets to thereby form the carriage.

28. The method of claim 27, wherein the first lug is mounted on a corresponding shaft press fitted through the first lug, and rotatably mounting the first lug to the brackets includes placing the shaft through corresponding apertures of the brackets.

29. The method of claim 26, wherein the linear positioner includes a hydraulic cylinder, and coupling the linear positioner to the carriage and the pusher frame includes coupling the hydraulic cylinder to an alignment coupler that is mounted to the pusher frame.

30. The method of claim 23, wherein coupling the brackets to the carriage plate includes attaching the brackets to the carriage plate with bolts that extend through the underside and the upper surface of the carriage plate.

* * * * *